(12) United States Patent
Gyselinck

(10) Patent No.: US 9,674,348 B2
(45) Date of Patent: Jun. 6, 2017

(54) DEVICE AND METHOD ALLOWING TO SUCCESSIVELY USE SEVERAL TERMINAL DEVICES IN A SAME VOICE COMMUNICATION

(75) Inventor: Luc Gyselinck, Sint Niklaas (BE)

(73) Assignee: THOMSON LICENSING, Boulogne-Billancourt (FR)

(*) Notice: Subject to any disclaimer, the term of this patent is extended or adjusted under 35 U.S.C. 154(b) by 1519 days.

(21) Appl. No.: 11/988,775

(22) PCT Filed: Jun. 26, 2006

(86) PCT No.: PCT/EP2006/063554
§ 371 (c)(1),
(2), (4) Date: Jan. 14, 2008

(87) PCT Pub. No.: WO2007/006644
PCT Pub. Date: Jan. 18, 2007

(65) Prior Publication Data
US 2009/0122971 A1    May 14, 2009

(30) Foreign Application Priority Data
Jul. 13, 2005    (EP) .................................... 05447170

(51) Int. Cl.
*H04L 12/66*    (2006.01)
*H04M 3/42*    (2006.01)
(Continued)

(52) U.S. Cl.
CPC .... *H04M 3/42212* (2013.01); *H04L 65/1006* (2013.01); *H04M 3/428* (2013.01);
(Continued)

(58) Field of Classification Search
CPC ......... H04W 36/0083; H04W 36/0055; H04W 36/0005; H04M 3/42212; H04M 3/428; H04M 3/4283; H04L 65/1006
(Continued)

(56) References Cited

U.S. PATENT DOCUMENTS 4,839,918 A * 6/1989 Hata .............................. 455/462
5,999,615 A   12/1999 Sakakura
(Continued)

FOREIGN PATENT DOCUMENTS

JP    1183945    7/1989
JP    9191324    7/1997
(Continued)

OTHER PUBLICATIONS

Search Report Dated Aug. 22, 2006.
Rosenberg, J. et al., "SIP: Session Initiation Protocol" Standards Track, RFC 3261, Jun. 2002. (236 pages).

*Primary Examiner* — Ahmad F. Matar
*Assistant Examiner* — Jirapon Intavong
(74) *Attorney, Agent, or Firm* — Tutunjian & Bitetto, P.C.

(57) ABSTRACT

The present invention concerns an interconnect device and process for connecting a first network to a second network, comprising first connecting means for connecting the interconnect device to the first network, second connecting means for connecting the interconnect device to the second network, the second connecting means being connected to the first connecting means. The first connecting means and second connecting means are intended to permit a communication between a first terminal located on the first network and a second terminal located on the second network. The interconnect device detects a voice communication termination by the second terminal. If the voice communication has been initialized by the first terminal, it starts a delaying period for delaying the sending of an indication of the (Continued)

termination to the first terminal for allowing a terminal located on the second network to resume the voice communication before the end of the delaying period.

10 Claims, 3 Drawing Sheets

(51) Int. Cl.
  *H04L 29/06* (2006.01)
  *H04M 3/428* (2006.01)
(52) U.S. Cl.
  CPC .. *H04M 3/4283* (2013.01); *H04Q 2213/1328* (2013.01); *H04Q 2213/13034* (2013.01); *H04Q 2213/13196* (2013.01); *H04Q 2213/13204* (2013.01); *H04Q 2213/13213* (2013.01); *H04Q 2213/13271* (2013.01); *H04Q 2213/13348* (2013.01); *H04Q 2213/13389* (2013.01)
(58) Field of Classification Search
  USPC .......... 379/219, 220.01, 32.01, 212.01, 418; 370/352; 455/436, 519
  See application file for complete search history.

(56) References Cited

U.S. PATENT DOCUMENTS

| | | | |
|---|---|---|---|
| 8,565,751 B2* | 10/2013 | Nakamura et al. | 455/422.1 |
| 2002/0090947 A1* | 7/2002 | Brooks et al. | 455/436 |
| 2003/0156566 A1* | 8/2003 | Griswold et al. | 370/338 |
| 2004/0028194 A1 | 2/2004 | McClung et al. | |
| 2004/0235509 A1* | 11/2004 | Burritt et al. | 455/519 |
| 2005/0021872 A1* | 1/2005 | Poustchi et al. | 709/250 |
| 2005/0122963 A1 | 6/2005 | Jeon et al. | |
| 2005/0157708 A1* | 7/2005 | Chun | 370/356 |
| 2006/0178137 A1* | 8/2006 | Loveland | 455/414.1 |
| 2006/0187904 A1* | 8/2006 | Oouchi | 370/352 |
| 2006/0203988 A1* | 9/2006 | Rodriguez et al. | 379/265.01 |
| 2010/0118863 A1* | 5/2010 | Qian et al. | 370/352 |
| 2011/0019665 A1* | 1/2011 | Le Rouzic et al. | 370/352 |

FOREIGN PATENT DOCUMENTS

| | | |
|---|---|---|
| JP | 11055401 | 2/1999 |
| JP | 2000188635 | 7/2000 |
| JP | 2003283600 | 10/2003 |
| JP | 2003348115 | 12/2003 |
| JP | 2004248283 | 9/2004 |
| WO | WO 97/31492 | 8/1997 |
| WO | WO 02/067533 | 8/2002 |

* cited by examiner

DEVICE AND METHOD ALLOWING TO SUCCESSIVELY USE SEVERAL TERMINAL DEVICES IN A SAME VOICE COMMUNICATION

This application claims the benefit, under 35 U.S.C. §365 of International Application PCT/EP2006/063554, filed Jun. 26, 2006, which was published in accordance with PCT Article 21(2) on Jan. 18, 2007 in English and which claims the benefit of European patent application No. 05447170.1, filed on Jul. 13, 2005.

The present invention concerns a device and a method allowing to successively use several devices in a same voice communication.

In the Plain Old Telephone System, noted POTS, some operators provide the following feature in the telephone exchange.

A call arrives at a POTS line. A called party takes up the phone and comes in the connected state, meaning that there is a communication path between calling and called party.

The called party goes on hook. If on the same POTS line an off hook event occurs (by means of same or another phone on this same POTS line) within a specific period, the communication path is still available, under condition the calling party did not release the call yet (i.e. did no go on hook yet).

The feature is further clarified in the following example: a call arrives at a POTS line in a residential telephone network which contains two connected phones. One phone is located in the kitchen, another in a different room, the study room. A person takes up the phone in the kitchen, but should go to the study room to help the calling person. The phone in the kitchen goes on hook. The person walks to the study room and picks up the phone. In the meantime the calling party does not hang off. The communication can continue.

Voice over IP, noted VoIP, is the routing of voice over any Internet protocol network. The Session Initiation Protocol, noted SIP, is the leading protocol for voice over IP. It is defined in the RFC3261, defined by the Internet Engineering Task Force, June 2002. SIP provides call processing functions and features present in the POTS between one or more IP clients. The voice data flows over packet switched networks instead of the circuit switched network used for the POTS.

Usually in a residential network, a SIP stops at the device that interfaces to the Internet connection. This might be a Personal Computer or a residential gateway.

A residential gateway, which offers broadband access to the Internet, provides different services to the home network, such as voice, video and data. It usually comprises a SIP endpoint. And it provides a phone interface to the residential network.

With the SIP, when a phone goes on hook in the residential network, the communication is immediately released.

The US patent application US2005/0122963A1 dated Jun. 9, 2005, defines an IP based voice/video communication system and a call pickup/forwarding method by which if a new incoming call is received by a first terminal during a video communication, an off-hook call is picked up from the first terminal by a second terminal in response to the selection of a specific button on the second terminal.

The present invention concerns an interconnect device that allows to successively use several devices in a same voice communication.

To this end the invention relates to an Interconnect device for connecting a first network to a second network, comprising:
first connecting means for connecting the interconnect device to the first network,
second connecting means for connecting the interconnect device to the second network, the second connecting means being connected to the first connecting means,
the first connecting means and the second connecting means permitting a communication between a first terminal located on the first network and a second terminal located on the second network.

According to the invention, the second connecting means comprises:
means for detecting a voice communication termination by the second terminal,
and means for, if the voice communication has been initialized by the first terminal, starting a delaying period for delaying the sending of an indication of the termination to the first terminal for allowing a terminal located on the second network to resume the voice communication before the end of the delaying period.

According to an embodiment, the second connecting means are intended to send the indication of the termination to the first connecting means after the end of the delaying period.

And the first connecting means are then intended to send the indication of the termination to the first terminal.

Each connecting means are attached to a different network and the transmission of the information of the termination of the communication is done step by step between the first connecting means and the first terminal.

Advantageously, the second connecting means are intended to detect the resuming of the voice communication by a terminal located on the second network before the end of the delaying period. This permits the second connecting means to resume the communication between the first terminal and the terminal located on the second network.

Advantageously, the second connecting means comprises a timer for starting the delaying period when detecting a termination of a voice communication by the second terminal, the voice communication being initialized by the first terminal, between the first terminal and the second terminal. The timer also stops the delaying period when detecting the termination of the voice communication by a terminal located on the second network, and sets a configurable limit value to the delaying period.

In a preferred embodiment, the voice communication over the first network is a voice over Internet Protocol.

The invention also relates to a method in an interconnect device comprising first connecting means to connect to a first network, and second connecting means to connect to a second network, the method comprising the step of setting a voice communication initiated by a first terminal located on the first network, between the first terminal and a second terminal located on a second network.

According to the invention, the method comprises the steps of detecting a voice communication termination on the second network initiated by the second terminal and delaying the sending of an indication of the termination to the first terminal, for allowing a terminal located on the second network to resume the voice communication before the end of a delaying period.

According to an embodiment, the second connecting means send the indication of the termination to the first connecting means after the end of the delaying period, and the first connecting means send the indication of the termination to the first terminal.

Advantageously, the second connecting means detect the resuming of the voice communication by a terminal located on the second network before the end of the delaying period.

The invention will be better understood and illustrated by means of the following embodiment and execution examples, in no way restrictive, with reference to the appended figures among which:

Figure 1:
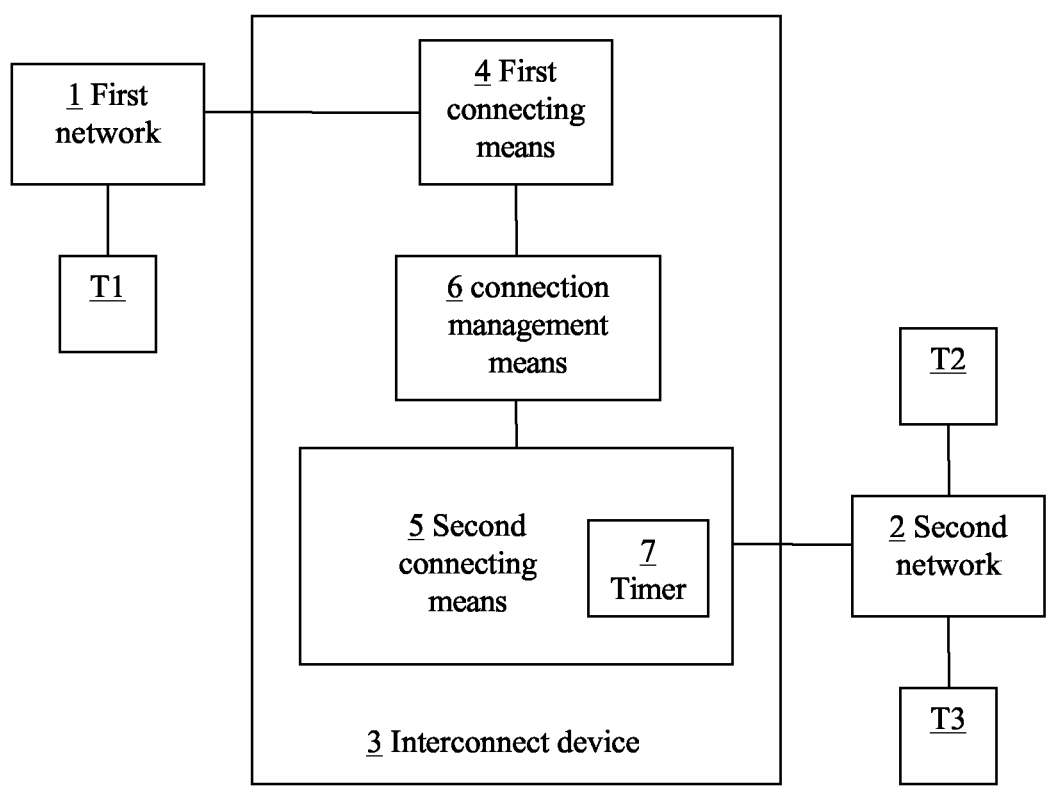
FIG. 1 is a schematic diagram showing the interconnect device attached to the first terminal on the first network and the second terminal on the second network.

FIG. 1 describes a system comprising all the devices present in the communication between a terminal T1 located on a first network 1 and a terminal T2 located on a second network 2.

The interconnect device 3 comprises first connecting means 4 to connect to a first network 1, and second connecting means 5 to connect to a second network 2. First connecting means 4 and second connecting means 5 are linked in the interconnect device through connection management means 6. Second connecting means 5 comprise a timer 7.

A terminal T1 is connected to the first network 1. Two terminals T2 & T3 are connected to the second network 2.

First connecting means 4 dialog with terminals located on the first network 1 that communicate to the interconnect device 3, such as the terminal T1. Second connecting means 5 dialog with terminals on the second network 2 that communicate to the interconnect device 3, such as the terminals T2 & T3.

Figure 2:
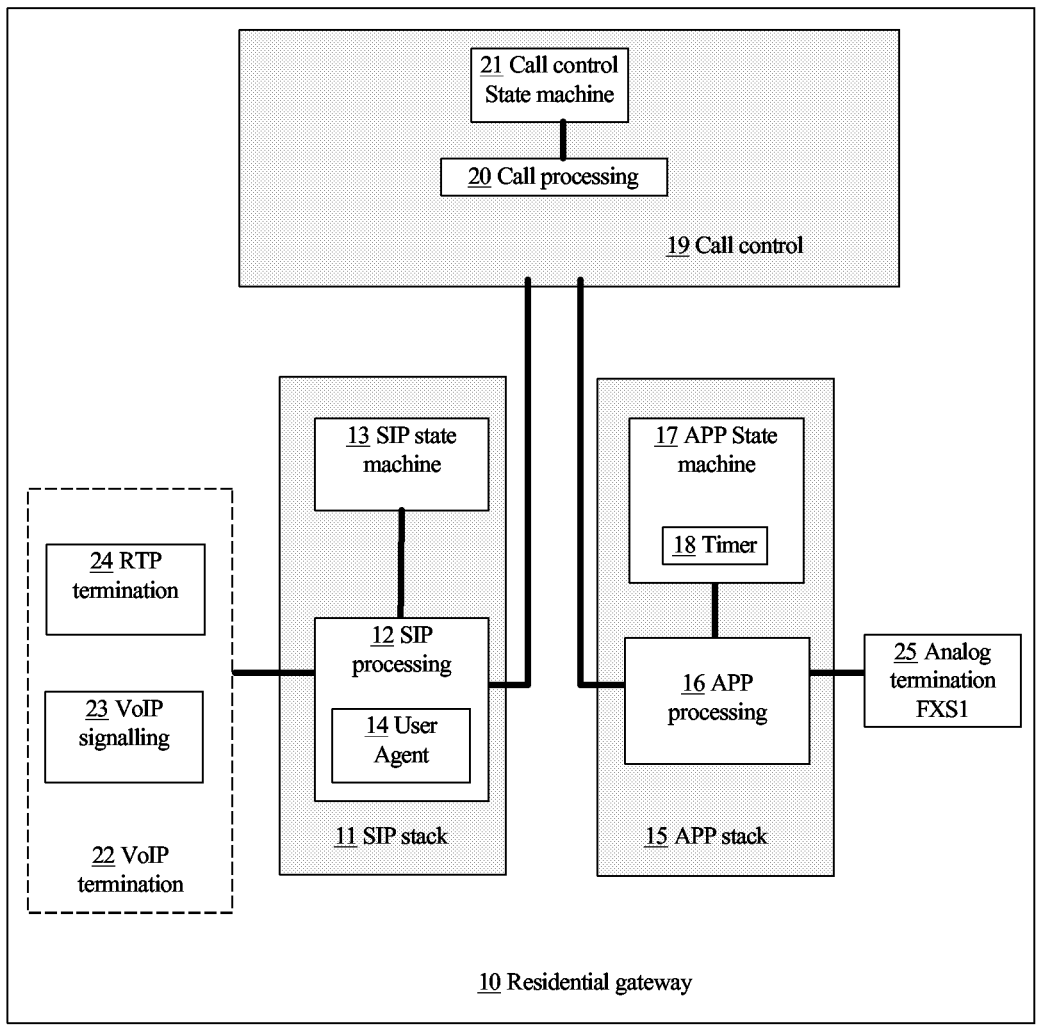
FIG. 2 is a detailed diagram showing the major modules of the interconnect device.

FIG. 2 describes a Residential Gateway 10, which is an example of an interconnect device. It depicts the basic components of the residential gateway 10 comprised in the communication.

The Residential Gateway 10 comprises a VoIP termination 22 that is a physical interface to the VoIP. The VoIP termination 22 comprises and RTP termination 24 and a VoIP signaling termination 23 to be able to dialog with a VoIP terminal on the first network. The RTP termination 24 is used for the transfer of the VoIP communication, while the VoIP signaling termination 23 is used for the control of the VoIP communication. This termination is used to allow VoIP over the broadband access to the Internet.

The Residential Gateway 10 also comprises an analog termination FXS1 25, that is a physical Foreign Exchange Station termination. FXS is a telephone interface that provides battery power, dial tones and ringing voltage. Analog telephones plug into a FXS to receive telephone service. Several phones can be connected to the FXS1 termination 25. This means that when a user receives a call it can pick up any of the connected phones. The analog termination allows the connection if residential phones.

The Residential Gateway 10 comprises a Session Initiation Protocol stack, noted SIP stack 11, and an Analog Phone Protocol stack, noted APP stack 15.

The SIP stack 11 is linked to the VoIP termination 22 and comprises a SIP state machine 13 and a SIP processing module 12. The SIP processing module 12 comprises means to perform all functions related to the SIP. And it interacts with the SIP state machine 13 when running the SIP. The SIP processing module 12 comprises a user agent module 14.

The user agent 14 is an internet endpoint that comprises a user agent client, noted UAC, that generates requests and a user agent server, noted UAS, that generates responses.

The APP stack 15 is linked to the FXS1 analog termination 25. It comprises an APP state machine 17 and an APP processing module 16. The APP processing module 16 comprises means to perform all functions related to the APP. And it interacts with the APP state machine 13 when running the APP. The APP state machine comprises a timer 18.

The SIP stack 11 and the APP stack 15 are linked to a call control module 19. The call control module 19 comprises a call processing module 20 and a call control state machine 21. The call processing module 20 interacts with the SIP processing module 12 and the APP processing module 16 to link a SIP connection to an APP connection.

Terminals attached to FXS1 can be analog POTS or DECT terminals. Instead of the FXS interface of the description, a Bluetooth interface can also apply.

Figure 3:
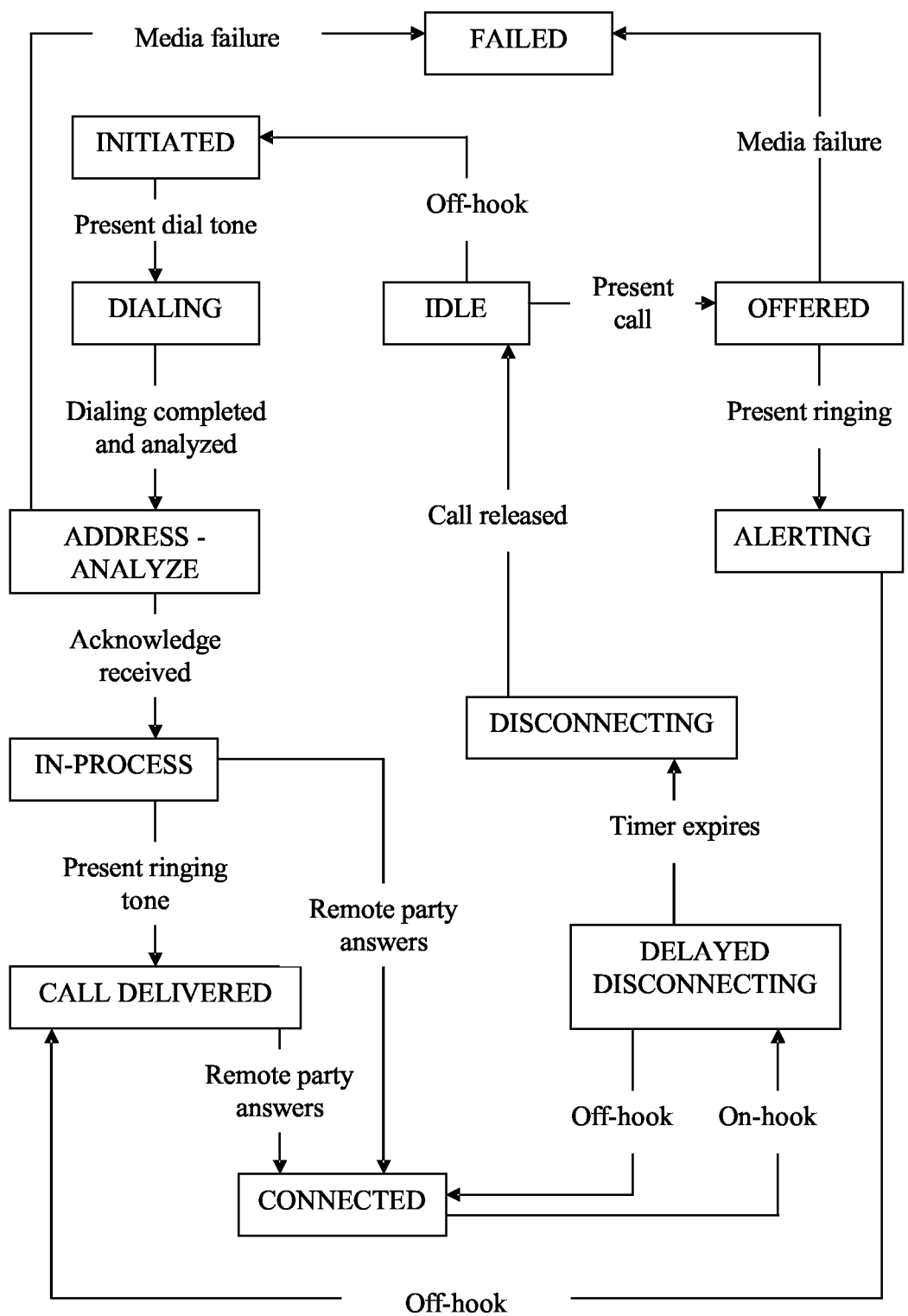
FIG. 3 is a representation of the Analogue Phone Protocol state machine.

The communication setup involves the SIP state machine 13 and the APP state machine 17 as described in FIG. 3.

FIG. 3 depicts the entire APP state machine 17. The invention focuses on the CONNECTED, DISCONNECTING and DELAYED DISCONNECTING states. When the terminal attached to FXS1 is in the CONNECTED state and that it goes on-hook, it is set to the DELAYED DISCONNECTING state and a timer starts. When the timer expires, the terminal moves to the DISCONNECTING state. If the terminal goes off-hook before the timer expires, the terminal is set to the CONNECTED state again.

The communication between terminals T1 and T2 is conducted as follows. SIP messages indicated in the following description are defined in the RFC3261.

For the communication setup, a SIP User Agent located in the terminal T1 initiates a communication with the SIP User Agent 14 located in the residential gateway 10. It sends a SIP INVITE request message.

The SIP User Agent 14 receives the SIP INVITE request message, and the SIP state machine 13 of the SIP stack 11 moves from IDLE to OFFERING.

The call processing 20 located in the call control 19 is notified about the incoming communication and checks which local physical Foreign Exchange Station termination, noted FXS port, is assigned to the SIP Uniform Resource Identifier, noted SIP URI, that is the SIP identity of the incoming communication.

FXS1 termination 25 is the one that is assigned to the SIP URI, and FXS1 termination 25 is currently not involved in a communication. The APP state machine 17 then moves from IDLE to OFFERED, and further to ALERTING state because ringing current is given to the FXS1 termination 25.

The SIP User Agent 14 then sends a SIP RINGING response to the SIP User Agent located in the terminal T1.

When the terminal T2 attached to the FXS1 termination 25 goes off hook, the APP state machine 17 moves from ALERTING to CALL_DELIVERED. The SIP state machine 12 then moves to ACCEPTED. And the SIP User Agent 14 sends a 200 (OK) response message to the SIP User Agent located in the terminal T1.

The SIP User Agent located in the terminal T1 then sends an ACK to the SIP User Agent 14. The SIP state machine 13 moves from ACCEPTED to CONNECTED. The APP state machine 17 moves from CALL DELIVERED to CONNECTED.

The communication release involves the SIP state machine 12 and the APP state machine 17.

When the terminal T2 attached to the FXS1 termination 25 goes on hook, the APP state machine 17 moves from CONNECTED state to DELAYED DISCONNECT state, and it launches a timer 18.

If the timer 18 expires, the APP state machine 17 moves from DELAYED DISCONNECT to DISCONNECTING. And the SIP User Agent 14 send a BYE message to the SIP User Agent located in the terminal T1.

When the SIP User Agent located in terminal T1 replies with an OK message,
- the SIP state machine 13 moves from DISCONNECTING to DISCONNECTED, and returns to the IDLE;
- the APP state machine 17 moves from DISCONNECTING to IDLE.

Internal resources are freed.

If the FXS1 termination 25 goes off hook before the timer 18 expires, the APP state machine 17 moves from DELAYED DISCONNECT to CONNECTED, and stops the timer 18. The communication is resumed.

The SIP state machine 13 is not involved in the process during the DELAYED DISCONNECT state in the APP stack 15.

The timer 18 is set to a default value of 60 seconds. This value is configurable locally or remotely. This is configurable with the residential gateway control command configuration means.

If in the previous description, the voice communication is not initiated by a terminal located on the first network, but initiated by a terminal located on the second network, when the terminal T2 attached to the FXS1 termination 25 goes on hook, the APP state machine 17 moves from CONNECTED to DISCONNECTING. It bypasses the DELAYED DISCONNECTING state.

In any case, when the terminal T1 goes on hook, the communication is terminated. No delaying period is used.

The invention claimed is:

1. An interconnect device for connecting a first network to a second network, comprising:
    a first connector for connecting said interconnect device to said first network, and
    a second connector for connecting said interconnect device to said second network, said second connector being connected to said first connector,
    said first connector and second connector permitting a communication between a first terminal located on said first network and any one of a plurality of second terminals located on said second network,
    wherein, said second connector is configured to detect a termination of a voice communication initiated by any second terminal located on said second network,
    if said voice communication has been initialized by said first terminal, a timer is launched to start a delaying period for delaying the sending of an indication of said termination of the voice communication, from said second connector to said first connector wherein said second connector is configured to detect a resumption of said voice communications by any of the plurality of second terminals located on said second network before the end of said delaying period, and
    to stop the timer when resumption of the voice communication by any one of the plurality of second terminals is detected to allow said resumption of the voice communications,
    wherein, if said voice communication has been initialized by said second terminal, the indication of said termination of the voice communication is sent to said first connector without launching the timer to start the delaying period.

2. The interconnect device according to claim 1, wherein said second connector is configured to sends the indication of said termination to said first connector after the end of said delaying period.

3. The interconnect device according to claim 2, wherein said first connector is configured to send the indication of the termination to said first terminal.

4. The interconnect device according to claim 1, wherein said second connector is configured to detect the resuming of said voice communication by a terminal located on said second network before the end of said delaying period.

5. The interconnect device according to claim 1, wherein said second connector comprises a timer configured to:
    start said delaying period when detecting a user initiated termination of a voice communication by said second terminal, said voice communication being initialized by said first terminal, between said first terminal and said second terminal,
    stop said delaying period when detecting the user initiated termination of said voice communication by a terminal located on said second network, and
    set a configurable limit value to said delaying period.

6. The interconnect device according to claim 1, wherein said voice communication over said first network is a voice over Internet Protocol.

7. A method for allowing successive use of several terminal devices in a same voice communication, the method comprising, in an interconnect device having a first connector configured to connect to a first network and a second connector configured to connect to a second network:
    setting a voice communication initiated by a first terminal located on a first network, between said first terminal and any one of a plurality of second terminals located on a second network,
    detecting a termination of voice communication on said second network initiated by one of said plurality of second terminals,
    starting a delaying period for delaying the sending of an indication of said termination of the voice communication, from said second connector to said first connector,
    detecting a resumption of said voice communication by any one of the plurality of second terminals located on said second network before the end of the delaying period; and
    stopping said delay period when resumption of the voice communication by any one of the plurality of second terminals is detected to allow said resumption of the voice communication,
    wherein when voice communication has been initiated by a second terminal, sending an indication of said termination of the voice communication from said second connector to said first connector without starting a delaying period.

8. The method according to claim 7, wherein a second connector of a residential gateway sends the indication of said termination to a first connector of said residential gateway after the end of said delaying period.

9. The method according to claim 8, wherein said first connector sends the indication of said termination to said first terminal.

10. The method according to claim 7, wherein said second connector detects the resuming of said voice communication by a terminal located on said second network before the end of said delaying period.

* * * * *